United States Patent [19]

Johnson

[11] 4,114,424
[45] Sep. 19, 1978

[54] GAS-FLUID-SOUND ISOLATION DOOR ASSEMBLY WITH INTEGRAL TESTING MEANS

[76] Inventor: Andrew P. Johnson, 1620 Kensington Rd., Bloomfield Hills, Mich. 48013

[21] Appl. No.: 711,219

[22] Filed: Aug. 3, 1976

[51] Int. Cl.² .............................................. G01M 3/32
[52] U.S. Cl. ...................................... 73/40; 114/117; 220/85 R; 220/232
[58] Field of Search ................ 73/40, 46, 49.8; 277/2; 114/117, 201 R, 201 A; 220/232, 239, 85 R, 387; 49/477, 483

[56] References Cited

U.S. PATENT DOCUMENTS 2,345,387  3/1944  Elsey .......................................... 73/40

Primary Examiner—Richard C. Queisser
Assistant Examiner—Joseph W. Roskos
Attorney, Agent, or Firm—Dolgorukov & Dolgorukov

[57] ABSTRACT

The specification discloses an isolation door assembly which, by virtue of having annuli provided about the joint between the door coaming and the door framing, about the seal between the door and the coaming, and about any penetration of the door by shafts, etc. provides the means to test the door assembly at installation, and at specified testing intervals.

By providing pressure fittings (normally plugged) which communicate with the annuli described above, and introducing a testing medium under pressure into said annuli, the integrity of all door seals can be tested.

26 Claims, 8 Drawing Figures

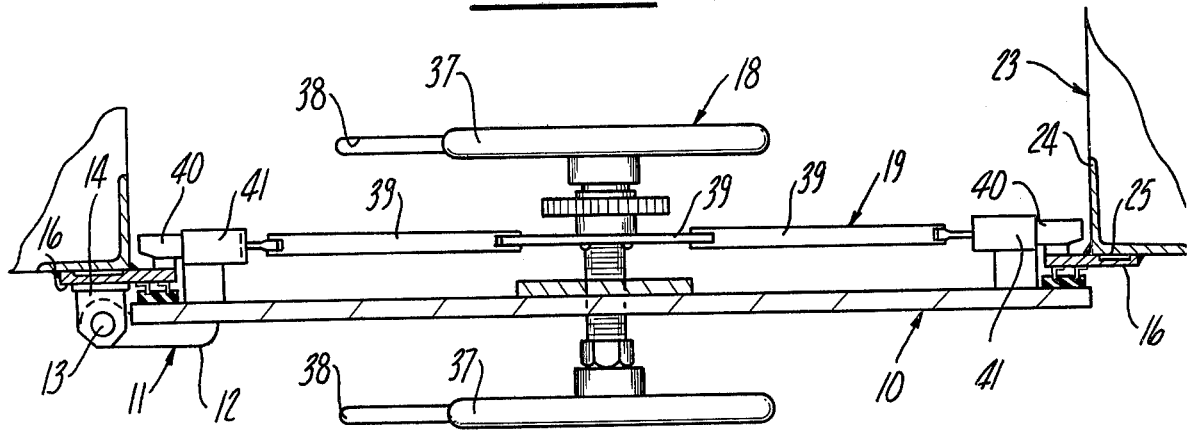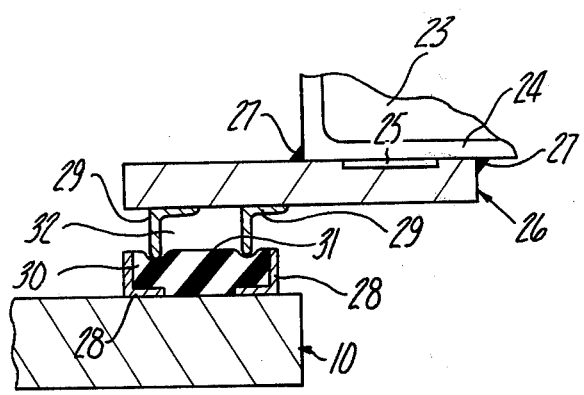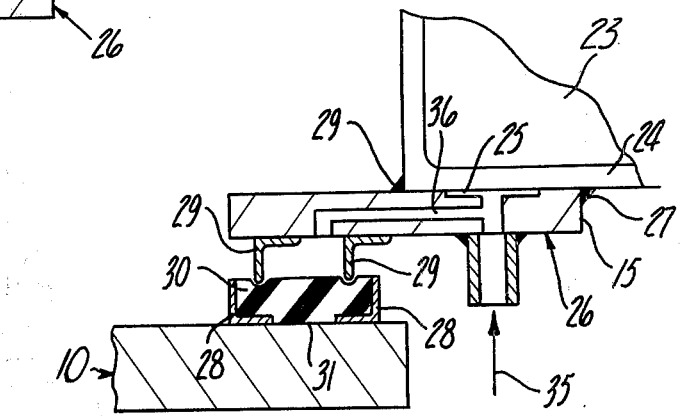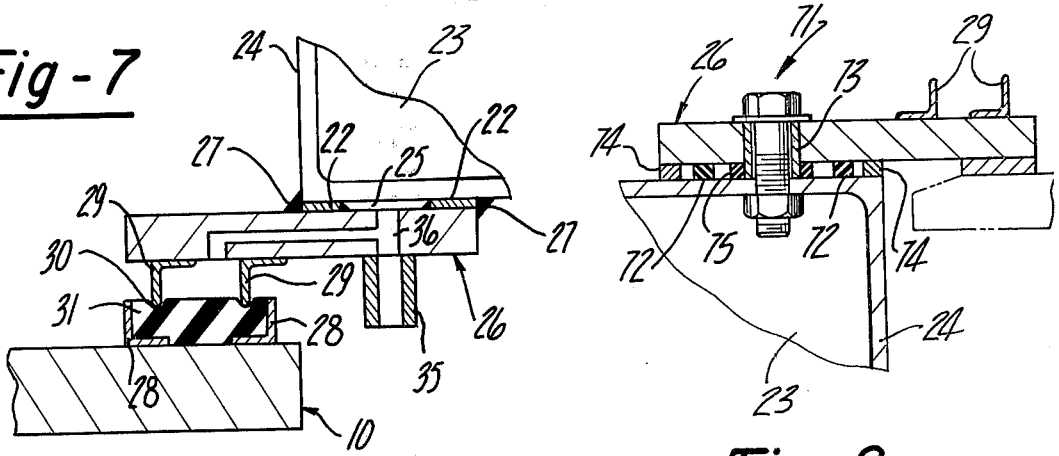

GAS-FLUID-SOUND ISOLATION DOOR ASSEMBLY WITH INTEGRAL TESTING MEANS

This invention relates to an isolating door assembly in general, and more particularly to such assemblies with integral testing means. A serious problem has existed ever since the occurrence of the need for chambers to be sealed with isolation doors. This problem involves how to ensure the integrity of the door not only during installation, but also during the use of the article on which the door is installed.

It should be understood that whenever the term "isolation door" is used, it is to mean a door capable of isolating an environment of gas, fluid, or sound on one side of the door from an environment of gas, fluid, or sound on the opposite side of the door. Also, a combination of gas, fluid, or sound may be present on either side of said door.

For example, if an isolation door is installed in a water tight bulkhead on a ship, how does one make sure the door, as installed, is water tight witout undue expense, and how does one continue to check on its water tight integrity as it is used? To present this problem on a more easily imaginable scale, one may consider the water tight doors used on smaller container vessels such as pressure vessels, or nuclear reactors and the like.

These doors, for obvious reasons, must be tight, and must maintain their integrity during severe operating conditions for an extended length of time, and it must be possible to prove that they remain tight at varying inspection periods.

Up until the present time there have been only two methods of testing isolation doors, both of which are totally unsatisfactory for reasons to be explained.

The first and most obvious means of testing is to close the door and to fill the interior of the chamber which it is intended to seal, and then check for leakage.

The other method is to perform the reverse kind of test, where the chamber is too large to be filled from the inside. In this case, one builds a tank large enough to engulf the door in the medium being tested, somehow attaches such a tank to the outside of the door, and then tests for leakage.

While if the chamber is rather small, either one of these tests will work satisfactorily, whether the testing is done at installation or at certification intervals of perhaps every six months or a year, when the chamber is large, such as in a ship or in the aforementioned nuclear plants, the process becomes completely impractical.

In on case with which I am personally familiar, a nuclear reactor is involved, and it is proposed to build a tank costing many thousands of dollars to place over the fluid tight doors which are mounted on the reactor chambers, and then the test for leakage. In addition to involving the expenditure of thousands of unnecessary dollars to build this tank, further waste becomes necessary, as the strength of the door framing must be greatly increased to accommodate the mounting of this tank at periodic intervals.

Obviously, such a situation is completely unsatisfactory and even this method of testing, which is the most advanced to date, may well be impractical in many applications.

Thus, through the long history in the art of providing water tight doors, there has been no satisfactory method of testing the integrity of such doors.

This does not mean that solutions have not been attempted, as obviously the problem is of long standing an very difficult to solve.

Continuing work in this field led to the conclusion that where large spaces are involved, with correspondingly large water tight doors, an attempt had to be made to get away from trying to test such doors by filling the inerior of the chamber, or an exterior space with water.

An attempt was next made to pressurize such areas with air pressure either internally or externally. However, it was found that due to the volume involved, and the obvious difference between the pressure exerted on a seal between a given volume filled with air and one filled with water, that as a practical matter a sufficient air pressure could not be introduced into the testing chamber, whether it was an exterior tank mounted around the fluid tight door, or the entire chamber itself, to exert a sufficient pressure on the seal.

Thus, the next attempt was to provide a smaller area to which the air pressure could be introduced. One such method, where no penetration of the water tight door itself was involved, was to provide an annulus in the sealing surface around the periphery of the fluid tight door.

A coaming would be mounted to the door frame with a U-shaped channel welded around the four sides of the opening which would then bear against a compressable seal provided on the door, and in this way a continuous annulus around the entire opening would be provided. Pressure could be introduced into this opening, and by means of introducing a predetermined air pressure and attaching a pressure gauge and watching for any pressure drop, it could be determined if there was a leak.

Such a system is still used in some instances where there is no penetration of the water tight door, and is thus satisfactory for some purposes.

However, it can be seen that as soon as there is penetration of the water tight door this method becomes entirely unsatisfactory, as while it would test the seal on the outside of the door, none of the penetrations through the door, such as the shaft which commonly connects with the locking mechanism, or any other shafts penetrating through the door would be tested, and there would be little sense in using a method of testing the seal on the outside of the door, when the remainder of the door would still have to be tested by the outdated methods previously discussed.

Thus, one of the objects of the present invention is to provide an improved isolation door assembly which can be used to seal any opening which must remain tight, regardless of size, whereby the difficulties and disadvantages of the prior constructions are overcome and largely eliminated, and a much simpler and durable construction provided.

Another object of the present invention is to provide an isolation door assembly of the foregoing nature which has integral testing means.

Another object of the present invention is to provide an isolation door assembly in which at the same time one can not only test the integrity of the seal around the water tight opening, but can test the integrity of any penetrations through the door and the door coaming in a simple and relatively easy manner.

A further object of the present invention is to provide an isolation door assembly of the above nature which can be used on any size container which must be sealed.

A further object of the present invention is to provide for the sealing of any size chamber at the time of its construction with a relatively simple and inexpensive to manufacture isolation door assembly which also provides for easy retesting of the integrity of the seal at any specified interval without undue expense.

A still further object of the invention is to eliminate the need for testing large chambers by the use of an external tank placed around the door, and thus also to eliminate the additional reinforcement around such doors necessary for mounting such testing apparatus.

Another object of the present invention is to allow for testing of the door seal and penetrations of a door simultaneously.

Another object of the present invention is to provide an isolation door assembly with integral sealing means which is relatively simple and inexpensive to manufacture.

Further objects and advantages of this invention will be apparent from the following description and appended claims, reference being had to the accompanying drawings forming a part of this specification, wherein like reference characters designate corresponding parts in the several views.

FIG. 2 is a sectional view taken in the direction of the arrows on the section line 2—2 of FIG. 1.

FIG. 3 is a view, partially in section, of the portion of FIG. 2 showing the sealing of the isolation door itself when the door is in a closed position, being pressed against the channel welded to the door coaming, and forming the annulus around the outside of the door.

FIG. 4 is a view similar in part to FIG. 3 but showing the door coaming having integral passages provided therein so that upon an introduction of a testing medium through the inlet, both the integrity of the weld fastening the door coaming to the door frame, and the integrity of the door seal will be tested.

FIG. 7 is a view substantially similar to that of FIG. 4, but showing an alternate embodiment of the present invention wherein an annulus is formed around the opening of the door frame by the application of a double row of gasket material before fastening the door coaming to the door frame.

FIG. 8 is a view, also substantially similar to FIG. 4, but showing the coaming attached to the door frame with nut and bolt assemblies and suitable spacers.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description, and not of limitation.

Further, I wish it known that the term "isolating" as used in the art refers to any type of material, whether one is attempting to seal against the escape of gas, fluid or sound.

Being one long involved in the manufacture of doors of all types, such as overhead doors, vertical lift doors, sliding doors and the like, all of which I had the occasion to make in the form of an isolation door at one time or another, I was well aware that the problem is not how to make an isolation door, but how to provide an easily vertifiable isolation door. I immediately recognized that the providing of a door which had to be tested by filling the chamber to be tested with a fluid of any type would provide only a limited solution. Also, that the providing of simply a continuous annulus around the opening would not be satisfactory, as first of all it would only test the one seal leaving the coaming and any penetration of the door untested, and would not even provide a satisfactory test for the one seal, as without any interruptions in the annulus there would be no way to tell which direction the air pressure would travel, and thus no way to tell whether the pressure traveled entirely around the annulus and, therefore, tested all possible areas of leakage. Therefore, I used none of these old ideas, but instead used a combination of different type annuli as best known in the various figures of the drawings.

Figure 1:
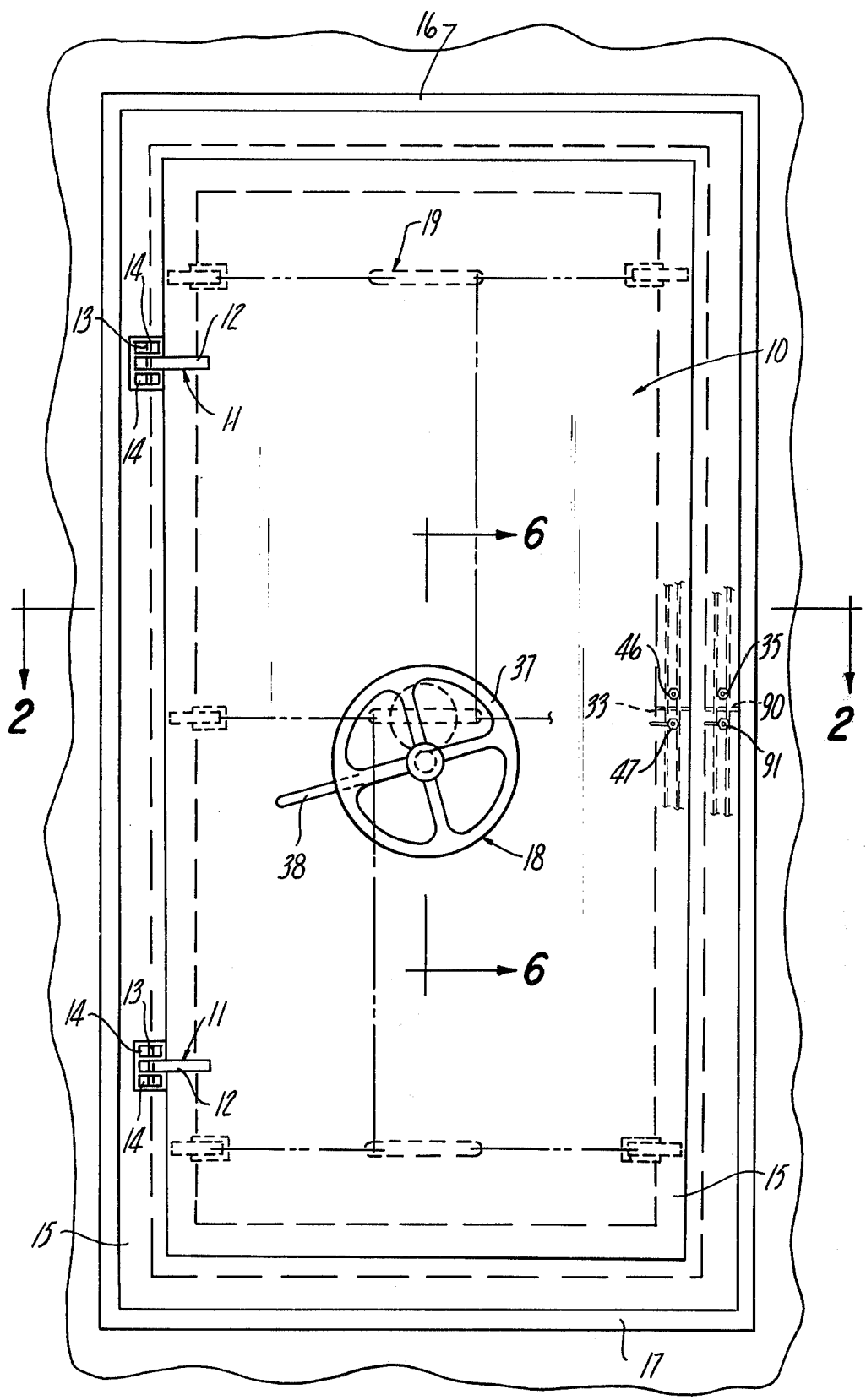
FIG. 1 is an elevational view showing an isolation door assembly embodying the construction of the present invention.

Referring to FIGS. 1 and 2 specifically, a construction embodying my invention is shown therein, and incudes first a thick steel door generally designated by the numeral 10. The steel door 10 is, in turn, mounted to two hinge assemblies generally designated by the numeral 11 consisting of the hinge brackets 12 welded to the door 10 and being supported for rotation by the hinge pins 13 in the hinge supports 14. It may be desired that the pins 13 ride in slots in the supports 14 to provide that an even compression is made possible. Another means of providing the same function is by the use of an articulating hinge.

The hinge supports 14 are in turn mounted, depending on the direction of swing of the door, on one of the vertical uprights designated by the numeral 15. Vertical uprights are commonly referred to as door jambs, and in combination with the header 16 and the door sill 17 commonly form what is known in the art as the door coaming.

The remainder of the embodiment comprises the door handle assembly generally designated by the numeral 18, and the door locking assembly generally designated by the numeral 19.

In a typical isolation door assembly installation, it is common to find the opening made of concrete or steel or other material which is generally designated by tne numeral 23, into which is embedded the door frame 24. The door coaming consisting of the jambs 15, the header 16, and the sill 17 is then welded to the door frame 24 and the door 10 is mounted by way of the hinges to the coaming, with any such assemblies as the door handle assembly 18 penetrating the door 10 completing the assembly.

It can now be seen that there are several possibilities for leakage. These exist at the weld of the coaming to the door frame, at the seal between the door 10 and the coaming, and at the penetration of the door 10 by the door handle assembly 18.

It is obvious that no simple solution to this problem has previously been available which allows testing all these possibilities for leakage simultaneously in an effective and economical manner.

As previousy mentioned, a novel feature of my invention resides with the providing of a combination of annuli forming internal testing passageways at critical leakage points. The first of these involves the providing of an annulus 25 around the entire periphery of the door coaming consisting of the door jambs 15, the header 16, and the sill 17, which I will now generally designate by the numeral 26.

Such an annulus may be provided in several fashions if the door framing 25 provides a mounting surface for the coaming in a flat plane, which is critically important for the sealing of the door. If the frame 24 is flat, no shimming of the coaming 26 to the framing 24 is needed, and the annulus may be provided by providing recesses in the coaming 26, as shown in FIGS. 3 and 4, a groove (not shown) may be provided in the frame 24.

As soon as the coaming is entirely welded to the door frame 24 by the two welds designated by the numeral 27, the annulus 25 is provided.

As previously discussed, a pressure can be introduced by any suitable means into the annulus 25, and by the use of any suitable test for leakage, such as a bubble test, or the attaching of an air pressure gauge, the integrity of the welds retaining the coaming 26 to the door frame 24 could be tested.

It should be understood at this point that any type of welding which is suitable for the particular application could be used to retain coaming 26 to the door frame 24. In addition, the coaming could be fastened to the door in any acceptable manner such that pressure could still be applied, such as by bolts, studs, or bolts with nuts and washers.

FIG. 8 shows how the coaming 26 may be attached to the door frame 24 by the use of nut and bolt assemblies, generally designated by the numeral 71. In this construction, the coaming annulus 25 is formed by the use of a double row of a suitable gasket material 72 placed a predetermined distance apart sufficient to allow a testing medium to flow freely about the assembly 71. To prevent distortion of the coaming 26 when a variable fastener such as a bolt is used, it is necessary to limit the distance the gasket 72 is compressed. This is accomplished by the use of a bolt spacer 73 and a pair of continuous strip spacers 74. In this manner, when the bolt is tightened, only enough force can be applied to compress the gaskets 72 to the thickness of the spacers 74.

To complete the assembly, an annular sealing washer 75 surrounds the spacer 73 to prevent the escape of the testing medium past the spacer 73 into the bolt hole 63 and past the bolt and nut assembly 71.

It should be understood, however, that regardless of what fastening means are used, appropriate changes must be made in the manner of attaching the coaming to the door frame so that a double seal with an annulus between the seals is established totally surrounding the perimeter, with the exception of the barrier between the testing inlet and outlet, and an appropriate seal, with free space on all sides to be used to seal any penetration of the coaming and/or framing.

If the door frame 24 is not in a completely flat plane, such as in the case shown in FIG. 7, it will be necessary to use shims 22 not only to shim the coaming to assure that it is in a perfectly vertical plane, but to also provide the annulus 25. In this case starting with the highest point of the door frame 24, a shim of a predetermined thickness is inserted, and continuously thicker shims are inserted until the coaming is brought into a perfectly vertical plane, at which time the coaming 26 is welded by way of the welds 27 to the door frame 24, again providing the annulus 25. In this case the shims used are designated by the numeral 22. In a manner similar to that described before, an air pressure introduced into the annulus 25 through the connection 35 will provide a test for the integrity of the welds 27.

At this point then, I have described how to test very easily for one type of the three types of leakage previously discussed. The next type of leakage, and one which has provided one of the greatest problems to date, involving the use of the external testing tanks or the filling of the entire cavity which the door is to seal, involves the seal between the door 10 and the coaming 26. I now make a special adaptation of the use of the annulus in the coaming and apply it to the door seal.

To provide the annulus at the sealing surface of the door, a pair of right angle steel angles are mounted in a mutually opposed parallel spaced relationship on the door 10 entirely around the periphery of the door. Such angles are designated by the numeral 28. A sealing material is then poured or otherwise placed between the angles to form a continuous gasket 31. It should be understood that any type of gasket, such as a cord seal, graphite seal, etc. could be used, depending on the particular sealing application of the door and its environment.

On the complimentary surface of the door coaming 26, a similar pair of steel angles 29 are continuously seal welded to the coaming in a parallel identically oriented relationship so that the space between the channels on the coaming is less than that on the door. It can be seen that when the door is closed the edge regions 30 of the channels 29 will depress the gasket 31, thereby providing an annulus entirely about the periphery of the door. It can be seen that the angles could be mounted in any orientation and be made of any material suitable for the intended application of the door.

Figure 5:
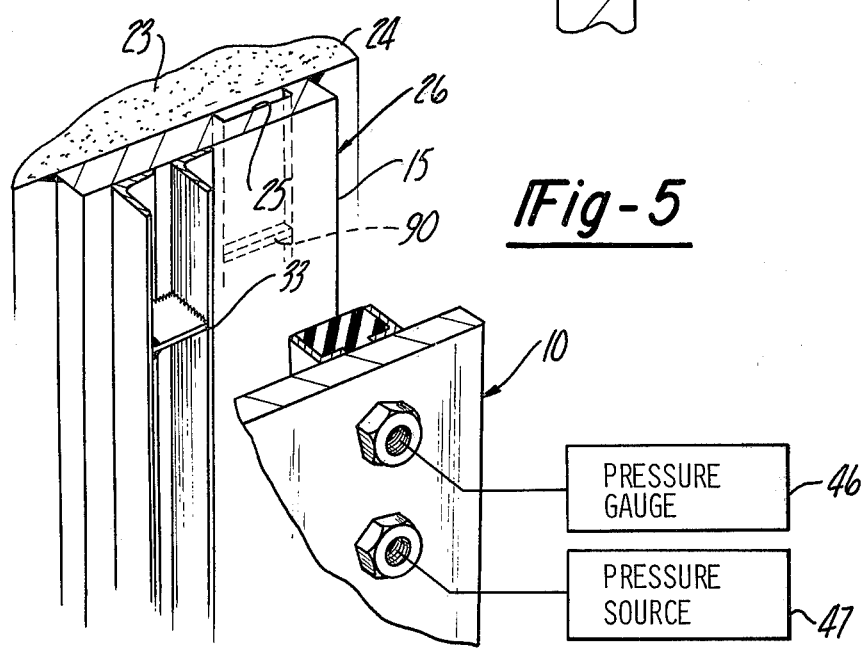
FIG. 5 is a partial view of the construction embodying the present invention shown in FIG. 1, showing in enlarged detail the pressure inlet and pressure gauge connections to the door.

To be certain that the pressure passes entirely around the door annulus 32, an obstruction 33 is placed in the path thereof, as best shown in FIG. 5. If it is desired to simply test the door annulus 32, a pressure gauge would be connected, as shown in FIG. 5, on one side of the obstruction 33, and a pressure source would be connected on the other side at the point indicated. The testing points would be plugged, of course, except during the test. However, when opened and connected, it is obvious that the pressure must travel entirely around the annulus 32 to reach the pressure gauge, and this would provide a valid test of the door annulus 32.

However, another novel feature of my invention is the fact that not only can the door annulus be tested in this manner, but the door annulus can be tested together with the coaming annulus by the providing of internal passageways between the door annulus 32 and the coaming annulus 25. In this event, connections 35 and 91 would be provided on either side of the barrier 90, and connections 46 and 47 would be eliminated. A pressure gauge would then be connected on one side of the barrier 90, and a pressure source would be connected on the opposite side using connections 35 and 91, a testing medium would be admitted, and the pressure gauge would be watched for any drop in pressure. In this manner, both annuli can be tested simultaneously.

Such passageways are shown particularly in FIGS. 4 and 7, and could be provided in the construction shown in FIG. 3, if desired. In this manner, door annulus 32 and coaming annulus 25 can be tested in combination, which is something which was not previously possible in the prior art, in a simple, inexpensive and rapid manner, both at the time of the installation of the door, and at any desired intervals thereafter, without having to use the outdated methods of pressurizing a chamber or providing a large tank on the outside of the door, as had to be done before.

Having achieved this significant advance in the art, a novel product was provided, but still not being satisfied, I decided to go ahead and solve the last problem presented, that of how to preserve the integrity of any penetration through the door, such as by the handle used to operate the door locking means. The handle assembly is generally designated by the numeral 18, and operates the door locking assembly 19, as previously described. To be more specific, the door handle assembly 18 could consist of door handles 37, locking levers 38, various connecting links 39, sliding locking bars 40, and guideways 41, which operate in a standard matter with the rotating of the handle 37.

Since such locking mechanisms are very common, and thus old in the art, and any particular configuration of the locking mechanism would depend on the application to which the door is to be put, it is not deemed necessary to describe any particular locking mechanism in any greater detail than has been done heretofore.

Figure 6:
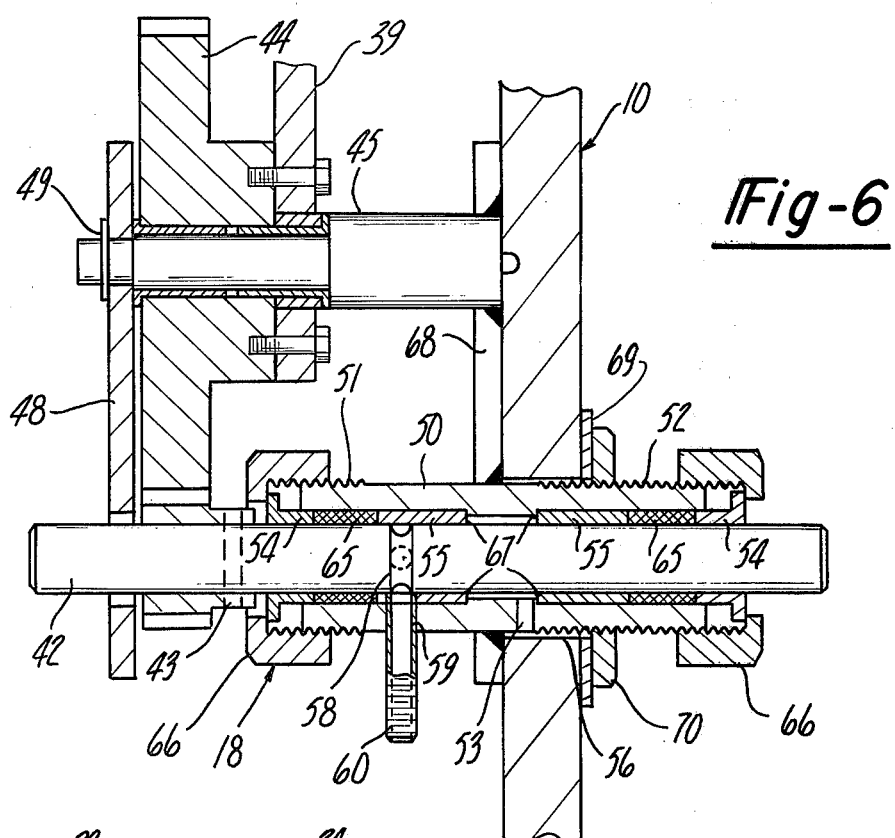
FIG. 6 is a sectional view taken in the direction of the arrows on the section line 6—6 of FIG. 1.

What is important in the present invention is that any shaft which penetrates the door 10 be sealed in a particular manner as more particularly described and shown in regard to FIG. 6.

As shown in FIG. 6, it is preferable that the entire locking mechanism be designed so that there is only one penetration of the door by a shaft 42 which will operate the entire assembly. The shaft 42 penetrates the door 10 and has mounted thereon a first small gear 43. A second shaft 45, preferably welded to the door 10 carries a large gear 44 which is operatively mounted on the shaft 45 and adapted to be rotated by the gear 43. The plate 48 maintains the shafts 42 and 45 in a fixed relationship. It is retained in place on the shaft 45 by the bolt and washer assembly 49. The linkage 39 is connected to the large gear 44, and upon the rotation of the gear 44, the linkage 39 then rotates, moving the movable links 39 and causing the sliding members 40 to move inwardly releasing their grip on the door coaming 26. This again is fairly standard in the art, and a novel point of the present invention is the particular treatment which the shaft 42 receives at the point where it passes through the door 10.

Instead of just passing through the door, a special bushing 50 is first provided which fits into a complimentary hold provided in the door, designated by the numeral 51. The hole in the door is chosen to be slightly larger than the bushing 50 so that air can pass between the entire periphery of the bushing and the hole. The bushing 50 is provided with a longer threaded bushing portion 52, shown as the right-hand threaded portion in FIG. 6, and a shorter threaded bushing portion 51 shown as the left-hand portion. For reasons to be explained, the longer threaded portion 52 will vary in length according to the thickness of the door, with the threads always beginning intermediate the inner and outer faces of the door. The other portion of the bushing, which could be considered that up to the aperture provided in the bushing at 53, will remain substantially the same length irregardless of the size of the door; the inner face of the door always covers said aperture 53. The packing glands 54 are provided within the bushing 50 to provide an even pressure on the packing 65. The two bushings 55 do not contact each other, but are spaced a distance apart sufficient to allow an air space around the periphery of the shaft 42 between the two bushings 55. At the point where a shaft annulus 58 has been previously provided around the shaft 42, an opening is left in the corresponding bushing 55 which communicates with a second aperture 59 provided in the body of the bushing 50. A pressure connector 60 is operatively connected to the second aperture 59.

A packing is provided between the packing glands 54 and the bushings 55 and is designated by the numeral 65. To complete the shaft assembly, conventional packing nuts 66 are screwed on to the previously provided threaded portions of the bushings 51 and 52 to place pressure against the packing glands 54, the packing 65 and the bushings 55 which provides a seal for the shaft assembly.

It should be noted that to provide the necessary pressure on the packing, the bushings 55 bear against a shoulder region 67 provided in the bushing opening. The plate 68, which is welded to the bushing 50, also has the shaft 45 welded thereto, and enables the entire assembly 18 to be made as unitary structure. The installation of such structure is completed by placing a suitable sealing compound between the plate and the door, inserting the bushing through the hole in the door, placing the lock washer 69 over the bushing 50, and tightening the locknut 70.

To test for a leak around the shaft penetration, it is now only necessary to introduce a suitable testing medium through the pressure inlet 60. The testing medium will enter the pressure connection 60, travel through the aperture 59 into the annulus around the shaft 58. From the annulus 58 the testing medium is free to pressurize the internal area of the bushing 50 defined by the facing edges of the packings 65 by virtue of said testing medium permeating around the surfaces of the shaft 42, around the bushings 55 and the space between the shoulders 67 and the shaft 42.

With the internal area of the bushing 50 pressurized as above, the stage is set for the testing of all possible leak sites of the shaft penetration, these being at both ends of the bushing where it is possible for the packings 65 to leak, letting air escape through the packing glands 54 and the packing nuts 66, and where the assembly 18 is attached to the door by the lock washer 69 and lock nut 70.

Leaks can be tested for at this point by virtue of the test medium being able to pass through the first aperture 53 and pressurize the space between the bushing 50 and the hole 56 at the same time said internal bushing area is pressurized.

To test for leaks of the shaft penetration, one merely introduces an appropriate testing medium into the internal bushing area through the pressure connection 60 until a predetermined pressure is reached, at which time one stops the flow of said medium and attaches a pressure gauge at said pressure connection. If the gauge does not show a pressure drop, there is obviously no leak.

However, if a pressure drop does occur, additional testing medium is again introduced through connection 30 until said predetermined pressure is reached, and a test, such as a bubble test, a sniff test, or other suitable test for leakage is made at all the leak sites to determine where the defective seal is. After locating the defective seal, appropriate repairs may be made.

It is now obvious that all three regions of leakage, the shaft penetration, the door annulus, or in other words the door seal, and the coaming fastening means can be checked merely by making simultaneous pressure connections to the fitting 35 and the connection 60, and in this way the entire doors integrity, and by this I mean the integrity of all possible leak sites in the entire door assembly, can be easily checked in a matter of minutes, rather than the hours which some of the previous methods would have taken. It also can be seen that it is done in a very simple, inexpensive and efficient manner.

Another benefit of my invention of a novel isolation door assembly is that such a door can be utilized in a new method of providing an instantaneous warning of the loss of integrity of any sealed chamber which can be equipped with an isolation door assembly embodying the construction of my invention.

With this new method, instead of introducing an appropriate testing medium under pressure only when you desire to test the integrity of the door, you now apply it continuously into all the annuli in the door assembly, and by way of a suitable system, continuously monitor the pressure at all three points. As previously, a drop in pressure will signal that a leak is present. However, since the isolation door assembly would most likely not be being watched by a human operator at the exact moment a leak would occur, a warning system, such as a bell, light, buzzer or the like would be connected to said monitoring system, to indicate in a graphic manner the occurrence of a pressure drop. Upon receiving a signal to the effect that a pressure drop has occurred, appropriate personnel may take corrective action.

If the pressure in the annuli is always kept higher than that of the chamber, which is important if a corrosive or otherwise dangerous environment is being contained, any pressure leak will be directed inward, containing such environment.

It should be understood that many pressurizing, monitoring and warning systems are available in the art, and any of such systems which are suitable for the environment being contained may be used.

Thus, by abandoning the old methods of testing doors, which involves filling chambers entirely with water, or mounting large tanks on the outside of the doors on flooding compartments in which they are being used, I have provided means to test any penetrations of the doors by any shafts, or the like, means to test the seals of the doors and the fastenings around the coaming of such doors in a simple, easy, and inexpensive manner, thus making a significant advance in the art.

I claim:

1. An isolation door assembly including in combination a door frame, a door coaming adapted to be attached to said door frame in a flat plane, means to attach said door coaming to said door frame in said flat plane in such a manner as to provide a continuous sealed coaming annulus therebetween, closeable means to admit pressure into said coaming annulus, a door hingedly mounted to said coaming, a sealing surface mounted about the periphery of said door, a complimentary sealing surface provided on said door coaming and adapted to provide a continuous sealed door annulus, closable means to admit a test pressure into said door annulus, a door locking assembly operatively mounted to said door having at least one shaft penetrating said door, means to seal said shaft, and means to test said shaft seal.

2. The device defined in claim 1, and including means to interrupt said coaming annulus at a single point immediately adjacent said pressure admitting means.

3. The device defined in claim 2, and including means to attach a pressure testing device immediately adjacent the side of said coaming annulus interruption opposite said pressure admitting means.

4. The device defined in claim 1, and including means to interrupt said door annulus at a single desired point immediately adjacent said test pressure admitting means.

5. The device defined in claim 4, and including means to attach a pressure testing device immediately opposite said door annulus interruption.

6. The device defined in claim 1, wherein said door and said coaming annuli are interconnected and suitable testing means are supplied to test said door annulus and said coaming annulus simultaneously.

7. The device defined in claim 1, wherein said means to attach said door coaming to said door frame include shims placed between said coaming and said framing until said coaming is completely flat, fastening means sealingly attaching said frame and also holding said shims in place, and thereby providing said annulus.

8. The device defined in claim 7, wherein said fastening means are in the form of nut and bolt assemblies, each operatively mounted through holes provided in said coaming and said frame, a pair of strip spacers mounted on each outside of said annulus parallel to said gaskets around the entire periphery of said coaming to limit the compression thereof, a bolt spacer placed over said bolt and between said coaming and said framing to prevent distortion of said coaming upon tightening, and a sealing washer adapted to be placed over said bolt spacer and to be compressed between said coaming and said framing means, thereby sealing the penetration by each bolt and nut assembly.

9. The device defined in claim 7, with said shims being of a metallic material placed continuously around the peripheries of the joint between said frame and said coaming to form said annulus, and said fastening means being in the form of continuous weldments.

10. The device defined in claim 7, with said door frame being completely flat, thus eliminating the need for shimming, and said coaming annulus being formed solely by a recess being provided in said coaming on the appropriate surface, and said fastening means being continuous weldments.

11. The device defined in claim 7, wherein said sealing surface mounted about the periphery of said door includes a plurality of right angle channels seal welded about the periphery of said door in a mutually opposed parallel spaced relationship to form a trough therebetween, and a suitable gasket material appropriately retained in said trough.

12. The device defined in claim 11, wherein said gasket material is poured rubber.

13. The device defined in claim 12, wherein said gasket material is poured silicone rubber.

14. The device defined in claim 11, wherein said gasket material is graphited material.

15. The device defined in claim 11, wherein said complimentary sealing surface is formed by a plurality of right angle steel angles seal welded about the inner periphery of said coaming in an identically oriented parallel spaced relationship and adapted to mate with said gasket material when said door is in its closed position.

16. The device defined in claim 15, wherein said shaft sealing means include a large bushing adapted to receive said shaft and having a shaft receiving portion of a diameter larger than said shaft and being adapted to receive packing glands, packings and bushings and having a shoulder portion provided therein and being sealingly fastened in a hole provided in said door, with said hole being slightly larger than said bushing.

17. The device defined in claim 6, wherein said bushing has a first aperture provided therein in communication with the interior of said bushing at the shoulder portion thereof proximate the inner face of said door.

18. The device defined in claim 17, with said bushing being provided with a shorter threaded bearing portion and a longer threaded bearing portion, both being adapted to receive a packing nut.

19. The device defined in claim 18, and including an annulus being provided on said shaft and a second aperture being provided in said bushing proximate the position of said annulus when said shaft assembly is completed.

20. The device defined in claim 19, with said shaft assembly having a bushing on each side of said shoulder portion, said bushing having an aperture proximate said second aperture where needed, a packing adjacent said bushing, a packing gland adjacent both packings, with said shaft being passed through both sets of said bushings, packings and packing glands, and a pair of packing nuts fastened to said threaded portions of said bushing.

21. The device defined in claim 20, with said bushing being secured in said hole in said door by an additional washer sealing secured to said second larger threaded portion of said bushing and bearing on said outer face of said door.

22. The device defined in claim 21, and including a pressure fitting removably connected to said second aperture.

23. The device described in claim 22, wherein said pressure fitting said pressure source and said pressure connection are adapted to receive a test pressure simultaneously.

24. The device defined in claim 7, with said door frame being completely flat, thus eliminating the need for shimming, and said coaming annulus being formed solely by providing a recess in said door frame.

25. A method of providing an automatic warning of loss of integrity of a sealed chamber having a sealing isolation door assembly of the type including in combination a door frame, a door coaming adapted to be attached to said door frame in a flat plane, means to attach said door coaming to said door frame in said flat plane in such a manner as to provide a continuous sealed coaming annulus therebetween, closeable means to admit pressure into said coaming annulus, a door hingedly mounted to said coaming, a sealing surface mounted about the periphery of said door, a complimentary sealing surface provided on said door coaming and adapted to provide a continuous sealed door annulus, closeable means to admit a test pressure into said door annulus, a door locking assembly operatively mounted to said door having at least one shaft penetrating said door, means to seal said shaft, and means to test said shaft seal, said method including the steps of continuously pressurizing said door, coaming and shaft annuli to a predetermined pressure with a suitable testing medium, continuously monitoring the pressure in said annuli for a pressure drop, and providing a suitable warning system adapted to indicate in a graphic manner that a pressure loss has occurred, thereby indicating a loss of integrity of one or more of said door, coaming or shaft seals, and thus a loss of integrity of said chamber.

26. The method defined in claim 25, wherein said continuous pressure is higher than the pressure in said chamber and, therefore, the environment in said chamber will be contained in the event of the loss of integrity of said chamber.

* * * * *